(12) United States Patent
Kennedy et al.

(10) Patent No.: US 10,102,160 B2
(45) Date of Patent: Oct. 16, 2018

(54) SPECULATIVE INTERRUPT SIGNALLING

(71) Applicant: ARM Limited, Cambridge (GB)

(72) Inventors: Michael Kennedy, Cambridge (GB);
Simon John Craske, Cambridge (GB);
Andrew Turner, Cambridge (GB);
Richard Anthony Lane, Cambridge (GB)

(73) Assignee: ARM LIMITED, Cambridge (GB)

( * ) Notice: Subject to any disclaimer, the term of this patent is extended or adjusted under 35 U.S.C. 154(b) by 561 days.

(21) Appl. No.: 14/581,290

(22) Filed: Dec. 23, 2014

(65) Prior Publication Data

US 2015/0220465 A1   Aug. 6, 2015

(30) Foreign Application Priority Data

Jan. 28, 2014  (GB) .................................. 1401418.7

(51) Int. Cl.
*G06F 13/32*   (2006.01)
*G06F 13/16*   (2006.01)

(52) U.S. Cl.
CPC ................................ *G06F 13/1684* (2013.01)

(58) Field of Classification Search
CPC  G05B 2219/13001; G05B 2219/15099; G06F 13/26; G06F 2213/2402; G06F 2213/2404; G06F 2213/2406; G06F 9/4818; H04L 12/40084
USPC ........................ 710/260–269, 240–244, 200
See application file for complete search history.

(56) References Cited

U.S. PATENT DOCUMENTS

| | | | |
|---|---|---|---|
| 2002/0194467 A1 | 12/2002 | Reilly et al. | |
| 2004/0111593 A1 | 6/2004 | Arimilli et al. | |
| 2005/0160425 A1* | 7/2005 | Falsett | G06F 9/4812 718/100 |
| 2006/0036792 A1* | 2/2006 | Chen | G06F 13/26 710/264 |
| 2007/0226742 A1* | 9/2007 | Hung | G06F 9/4887 718/103 |
| 2010/0036987 A1 | 2/2010 | Streett et al. | |

OTHER PUBLICATIONS

Search Report for GB1401418.7, dated Jul. 1, 2014, three pages.
Cantoni, "A technique for interrupt distribution in a multiprocessor system", *Software & Microsystems*, vol. 1, No. 6, Oct. 1982, pp. 153-159.

(Continued)

*Primary Examiner* — Tim T Vo
*Assistant Examiner* — Kim T Huynh
(74) *Attorney, Agent, or Firm* — Nixon & Vanderhye, P.C.

(57) ABSTRACT

A data processing system includes an interrupt controller having a priority level arbitrator and trigger circuitry. The priority level arbitrator and the trigger circuitry operate in parallel to process interrupt signals received by an interrupt signal receiver. The trigger circuitry generates a trigger signal initiating interrupt processing before the priority level arbitrator has completed its arbitration determination at an arbitration-completed time. If the interrupt processing triggered by the trigger signal was inappropriate, then is terminated once the result of the arbitration is known after the arbitration-completed time.

12 Claims, 2 Drawing Sheets

(56) References Cited

OTHER PUBLICATIONS

"KeyStone Architecture Chip Interrupt Controller (CIC) User Guide, Literature No. SPRUGW4A", http://www.ti.com/lit/ug/sprugw4a/sprugw4a.pdf, *Texas Instruments 2012*, Mar. 2012, 35 pages.

"ARM11 MPCore™ Processor; Revision: r2p0; Technical Reference Manual, ARM DDI 0360F", *ARM 2008*, Feb. 2008, 728 pages.

"Intel® 64 and IA-32 Architectures Software Developer's Manual vol. 3 (3A, 3B & 3C): System Programming Guide", http://www.intel.com/content/www/us/en/processors/architectures-softwaredeveloper-manuals.htm, *Intel 2013*, Nov. 13, 2013, 1446 pages.

\* cited by examiner

SPECULATIVE INTERRUPT SIGNALLING

BACKGROUND

Field

This disclosure relates to the field of data processing systems. More particularly, this disclosure relates to mechanisms for managing the receipt of interrupt signals from a plurality of different sources and arbitrating the priority levels associated with those different interrupt sources.

Description

It is known to provide interrupt controllers which arbitrate between priority levels associated with different interrupt signals which may be concurrently pending. In a real time processing system, a large number of potential interrupt sources may serve to trigger different processing responses. Some of these interrupt sources will have a higher level of priority associated with them compared with other of the interrupt sources. Accordingly, the interrupts are each associated with a priority level and when multiple interrupts are concurrently asserted, these priority levels are compared to determine the interrupt with the highest priority level such that the highest pending priority interrupt (HPPI) may be identified. The HPPI will be selected for processing before other of the pending interrupts.

SUMMARY

At least some example embodiments of the disclosure provide an apparatus for processing data comprising:

an interrupt signal receiver configured to receive a plurality of interrupt signals having respective priority levels;

a priority level arbitrator coupled to said interrupt signal receiver and configured to determine a highest priority level among interrupt signals concurrently asserted at a given time, said determination of said highest priority level completing at an arbitration-completed time following said given time; and trigger circuitry coupled to said interrupt signal receiver circuitry and configured to operate in parallel with said priority level arbitrator to assert a trigger signal for initiating interrupt processing before said arbitration-completed time if one or more of said plurality of interrupt signals are asserted.

The present technique recognises and exploits the realisation that priority arbitration may be split off from and handled in parallel with the signalling of an interrupt to initiate interrupt processing. The system may speculate that an interrupt signal it receives is the HPPI. In reality this speculation will likely be correct in a majority of cases and the performance gains due to the reduction in interrupt latency more than outweigh the impact of recovering from incorrect speculation.

At least some example embodiments of the disclosure provide an apparatus for processing data comprising:

interrupt signal receiving means for receiving a plurality of interrupt signals having respective priority levels;

priority level arbitrating means, coupled to said interrupt signal receiving means, for determining a highest priority level among interrupt signals concurrently asserted at a given time, said determination of said highest priority level completing at an arbitration-completed time following said given time; and trigger means, coupled to said interrupt signal receiving means, for operating in parallel with said priority level arbitrating means to assert a trigger signal for initiating interrupt processing before said arbitration-completed time if one or more of said plurality of interrupt signals are asserted.

At least some example embodiments of the disclosure provide a method of processing data comprising the steps of:

receiving a plurality of interrupt signals having respective priority levels;

determining a highest priority level among interrupt signals concurrently asserted at a given time, said determination of said highest priority level completing at an arbitration-completed time following said given time; and in parallel with said determining of said highest priority level, asserting a trigger signal for initiating interrupt processing before said arbitration-completed time if one or more of said plurality of interrupt signals are asserted.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
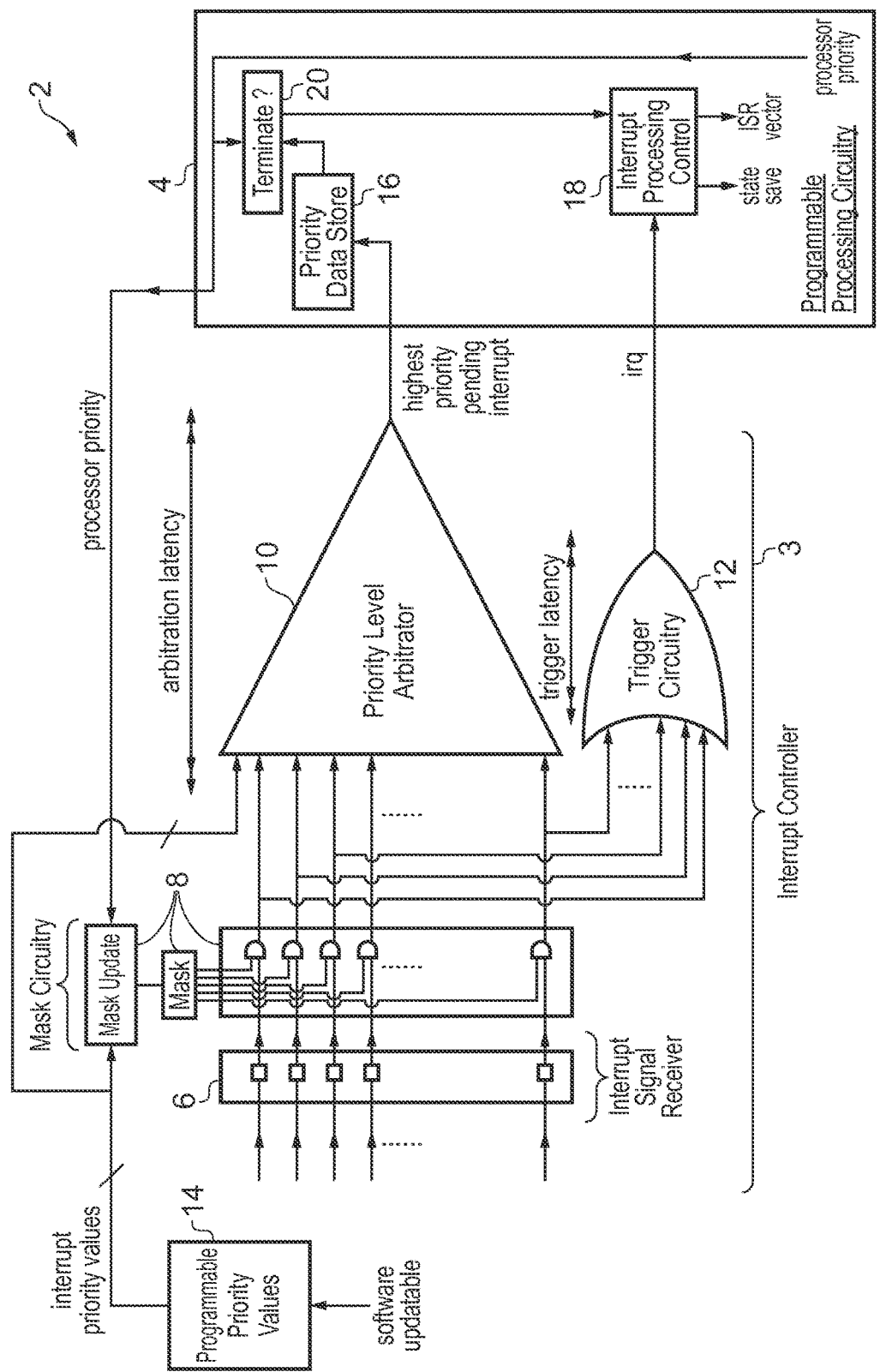
FIG. 1 schematically illustrates a processing system including an interrupt controller and a programmable processor.

FIG. 1 schematically illustrates a data processing system 2 including an interrupt controller 3 and programmable processing circuitry 4 in the form of, for example, a programmable processor core executing program instructions which may be subject to interruption by interrupt signals from the interrupt controller 3 in order to trigger the execution of interrupt service routines (ISRs). Such a general arrangement will be familiar to those in the technical field of real time processing systems.

The interrupt controller includes an interrupt signal receiver 6, mask circuitry 8, the priority level arbitrator 10 and trigger circuitry 12. The interrupt signal receiver 6 receives a plurality of interrupt signals each having an associated priority level. The priority levels are set under software control and stored within a memory 14.

The programmable priority levels are supplied to the priority level arbitrator 10 in order that it can perform the priority level arbitration which occurs in an arbitration period and is completed at an arbitration-completed time following a given time at which an interrupt is asserted. The mask circuitry 8 supplies a mask value to the interrupt signals received by the interrupt signal receiver 6 and passes forward to the priority level arbitrator 10 and the trigger circuitry 12 those interrupt signals which are not masked out by the mask value applied. The mask value is determined by mask update circuitry in dependence upon the interrupt priority levels (values) and the current processor priority level such that only those interrupts which have a priority level higher than the current processor priority level are permitted to pass through the mask circuitry 8 and reach the priority level arbiter 10 and the trigger circuitry 12. Whenever one of the programmable priority values (levels) is changed or the processor priority level is changed, then the mask update circuitry updates the mask value which is applied. Such updating of the mask value may take some processing cycles to complete, but once complete will filter out interrupts from reaching the processing circuitry 4 unless they have a priority level higher than the current priority level of the processing circuitry 4. This helps avoid pathological conditions in which repeated speculative triggering of interrupts prevents progress being made within processing performed by the processing circuitry 4.

The interrupts emerging from the mask circuitry 8 are passed in parallel to both the priority level arbiter 10 and the trigger circuitry 12. The trigger circuitry 12 may be a relatively simple wide OR circuit which generates a trigger signal IRQ if any of the inputs to it are asserted. The latency with which such a simple OR function may be performed is relatively low and accordingly the delay in issuing the trigger signal may be advantageously low. The trigger signal is issued to the processing circuitry 4 before the priority level arbitrator 10 has completed its arbitration operation and accordingly before the arbitration-completed time has been reached.

In a system containing a large number of interrupts, the priority levels may fine grained and represented by multi-bit numbers. The comparison of a potentially large number of multi-bit numbers to determine the HPPI is a process which has a significant latency associated with it. The latency with which an interrupt signal asserted may be serviced is an important performance parameter in many real time processing systems. Measures which can reduce the delay between an interrupt signal being asserted and the associated interrupt being initiated are advantageous.

The priority level arbitrator 10 receives the interrupt signal(s) from the mask circuitry 8 at the same time as they are received by the trigger circuitry 12. The priority level arbitrator 10 also receives the priority levels associated with those signals. The interrupt signals have associated with them an interrupt number corresponding to the physical input of the interrupt signal receiver 6 at which they were received. Priority level arbitrator 10 performs the function of determining a highest priority level among interrupt signals concurrently asserted at any given time. This determination takes an arbitration latency period before the result is output from the priority level arbitrator 10 as a signal identifying the highest priority pending interrupt (HPPI). This HPPI signal can include the interrupt number as an interrupt signal identifier of the HPPI as well as the priority level associated with the HPPI.

HPPI characterising data are stored within a priority data store 16 within the processing circuitry 4 as priority data. This priority data is not written into the priority data store 16 until after the interrupt processing has already been initiated by the IRQ signal generated by the trigger circuitry 12. Initiation of the interrupt processing accordingly is not delayed awaiting generation of the signal identifying the HPPI.

The processing circuitry 4 includes interrupt processing control circuitry 18 which receives the trigger signal IRQ and initiates the interrupt processing by first controlling state saving operations (such as saving the current register file contents) followed by starting the execution of an interrupt service routine (ISR) of program instructions. The initial part of the interrupt processing, such as the state saving, is reversible such that if the interrupt processing was incorrectly speculated, then no state data has been lost and the interrupt processing may be terminated.

A termination controller 20 within the processing circuitry 4 is responsive to the priority data written into the priority data store 16 to determine whether or not the priority level associated with the interrupt which has been speculatively initiated is or is not higher than the current processor priority level. If the termination controller 20 determines that the HPPI priority level is not higher than the current processor priority level, then it serves to terminate the interrupt processing being performed under control of the interrupt processing controller 18. The relative timing of the availability of the HPPI data compared with the initiation of the interrupt processing by the trigger signal may be such that only state saving operations which are readily reversible have taken place up to the point in time and accordingly a simple return may be made to the processing which was previously being performed and the interrupt which was initiated may be treated as spurious without undue complication or delay.

Figure 2:
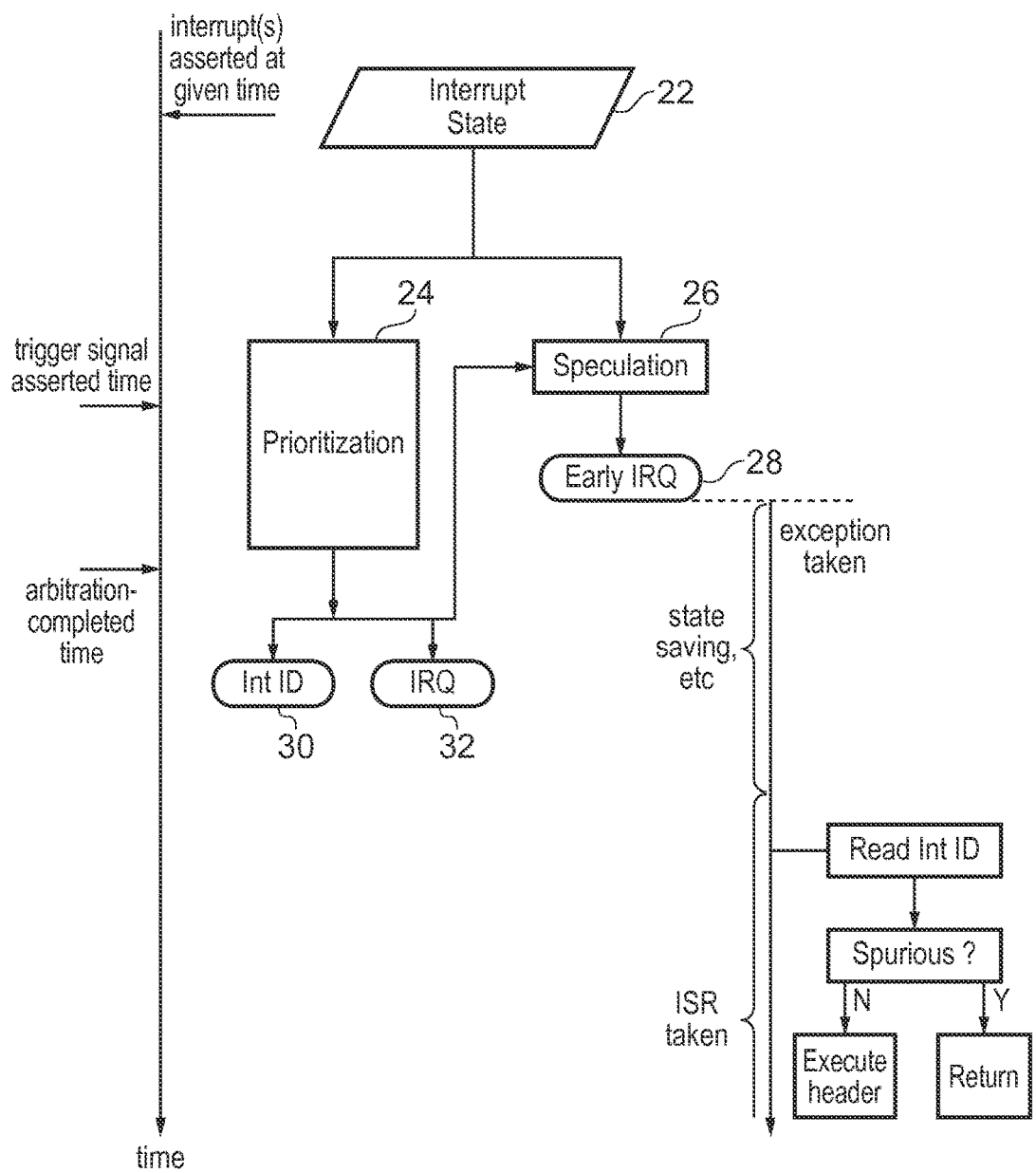
FIG. 2 schematically illustrates the flow of processing for interrupt handling within the system of FIG. 1.

FIG. 2 is a diagram schematically illustrating the flow of processing performed by the system of FIG. 1. The interrupts asserted at a given time constitute interrupt state 22 which is then subject to processing by the interrupt controller. Operating in parallel are the priority level arbitrator 10, which performs prioritisation 24, and the trigger circuitry 12, which initiates speculation 26 that results in the trigger signal being issued to initiate interrupt processing and the generation of an early IRQ signal 28. The prioritisation 24 is performed by the priority level arbitrator 10 and results in generation of an interrupt identifier 30 for the HPPI together with a non-speculative IRQ signal 32 as appropriate.

The given time at which the interrupt state 22 is generated, the time at which the trigger signal is first asserted and the arbitration-completed time at which the priority level arbitration 10 has generated the HPPI signal for the interrupt state 22 are all indicated on the time axis in FIG. 2. It will be seen that the trigger signal is asserted before the arbitration-completed time.

The early IRQ signal 28 initiates interrupt processing and an exception being taken. The first part of the interrupt processing is reversible, such as state saving actions. The subsequent part of the interrupt processing may involve execution of program instructions corresponding to an interrupt service routine (ISR) and takes place after the arbitration-completing time. The first action of the interrupt service routine may be to read the interrupt identifier from the priority data store 16 and determine whether or not the interrupt is spurious. One reason for the interrupt being spurious is that the interrupt was incorrectly speculated as would be identified by the termination controller 20. The termination controller 20 may cause the interrupt identifier to be set to a value which indicates that the interrupt is spurious. The interrupt identifier may be set to a value indicating that the interrupt is spurious for other reasons, such as in a multi-processor system the interrupt has already been processed by another processor. If the interrupt is spurious, then an immediate return from the interrupt routine may be triggered. If the interrupt is not spurious, than the execution handler within the interrupt service routine may be performed in the normal way.

The priority level arbitrator may be configured to store priority data indicative of the highest priority level to a priority data store following the completion of the arbitration process. The processing circuitry which is handling the interrupt processing may then read the stored priority data at an appropriate point in its interrupt processing to determine whether or not to terminate the interrupt processing if the priority data indicates a highest priority level that is lower than the processing that was being performed by the processing circuitry when the interrupt processing was initiated, i.e. the interrupt should not have been triggered as the interrupt did not have a sufficiently high priority level compared to the priority level of the processing which was already being performed by the processing circuitry.

The impact of incorrectly speculating interrupt processing may be reduced when the interrupt processing which is performed before the arbitration-completed time is selected so as to be reversible, e.g. no state data is lost or altered by the interrupt processing performed prior to the speculation being resolved. An example of such reversible processing which may be performed before the arbitration-completed time is the saving of pre-interrupt state values intended to be restored after the processing is completed. Typical interrupt servicing will perform such state saving as one of the initial actions performed and such actions may be speculated and reversed relatively easy. Reversal of such speculation may in fact require no action to be taken as no state change has taken place or only a minor change such as resetting a stack pointer value to a position prior to any speculative state saving to a stack memory.

In order to reduce incorrectly speculated interrupts mask circuitry may be connected between the interrupt signal receiver and the trigger circuitry. Such mask circuitry may be configured to suppress assertion of one or more of the interrupt signals that would otherwise result in the assertion of the trigger signal in dependence upon a programmable mask value. This mask value may be set by comparing a priority level of the interrupt signal concerned with a priority level of processing performed by the processing circuitry at that time to determine whether or not the given interrupt should or should not be permitted to interrupt that ongoing processing. There may be a lag associated with updating associated mask values, but once the mask values are in place, incorrect speculation may be suppressed. This is useful in avoiding pathological situations where repeated incorrect speculation is performed in a manner which prevents or inhibits forward progress within the processing which has been incorrectly interrupted.

The mask values may be updated whenever the priority levels associated with the interrupt signals or the priority level associated with the processing being performed by the processing circuitry is changed.

In some embodiments the interrupt signal receiver, the priority level arbitrator and the trigger circuitry may all be part of an interrupt controller. Such interrupt controllers may be separately provided within a data processing system, such as a system-on-chip integrated circuit. An interrupt controller may be used with a variety of different forms of processing circuitry and may be considered as an entity in its own right.

The processing circuitry which is subject to interrupt may have a variety of different forms. One common form for such processing circuitry is a programmable processor for executing program instructions. Within this context the interrupt processing may include execution of an interrupt service routine.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. An apparatus for processing data comprising:
   an interrupt signal receiver configured to receive a plurality of interrupt signals having respective priority levels;
   a priority level arbitrator coupled to said interrupt signal receiver and configured to determine a highest priority level among interrupt signals concurrently asserted at a given time, said determination of said highest priority level completing at an arbitration-completed time following said given time; and
   trigger circuitry coupled to said interrupt signal receiver and configured to operate in parallel with said priority level arbitrator determining said highest priority level among said interrupt signals to assert a trigger signal for initiating interrupt processing before said arbitration-completed time when one or more of said plurality of interrupt signals are asserted.

2. An apparatus as claimed in claim 1, wherein said priority level arbitrator is configured to store priority data indicative of said highest priority level to a priority data store following said arbitration-completed time.

3. An apparatus as claimed in claim 2, comprising processing circuitry coupled to said trigger circuitry and configured to initiate interrupt processing when said trigger signal is asserted and before said arbitration-completed time, said processing circuitry configured to read said priority data from said priority data store after said arbitration-completed time and to terminate said interrupt processing if said priority data indicates a highest priority level lower than a priority level of processing performed by said processing circuitry when said interrupt processing was initiated.

4. An apparatus as claimed in claim 3, wherein said interrupt processing performed before said arbitration-completed time is reversible.

5. An apparatus as claimed in claim 4, wherein said interrupt processing performed before said arbitration-completed time comprises saving pre-interrupt state values to be restored when said interrupt processing is completed.

6. An apparatus as claimed in claim 1, comprising mask circuitry connected between said interrupt signal receiver and said trigger circuitry and configured to suppress assertion of one or more of said plurality of interrupt signals from resulting in assertion of said trigger signal in dependence upon a mask value.

7. An apparatus as claimed in claim 3, wherein said mask circuitry is configured to determine said mask value by comparing a priority value or values of said one or more of said plurality of interrupt signals with a priority level of processing performed by said processing circuitry.

8. An apparatus as claimed in claim 7, wherein updating of said mask value from a current value to an updated value by said mask circuitry is performed in response to a change in one or more of said priority value or values of said one or more of said plurality of interrupts and said priority level of processing performed by said processing circuitry and following said change, but before completion of said updating, said current value for said mask value is used by said masking circuitry.

9. An apparatus as claimed in claim 1, wherein said interrupt signal receiver, said priority level arbitrator and said trigger circuitry are part of an interrupt controller.

10. An apparatus as claimed in claim 3, wherein said processing circuitry is a programmable processor for executing program instructions and said interrupt processing includes executing an interrupt service routine.

11. An apparatus for processing data comprising:
    interrupt signal receiving means for receiving a plurality of interrupt signals having respective priority levels;
    priority level arbitrating means, coupled to said interrupt signal receiving means, for determining a highest priority level among interrupt signals concurrently asserted at a given time, said determination of said highest priority level completing at an arbitration-completed time following said given time; and trigger means, coupled to said interrupt signal receiving means, for operating in parallel with said priority level arbitrating means determining said highest priority level among said interrupt signals to assert a trigger signal for initiating interrupt processing before said arbitration-completed time when one or more of said plurality of interrupt signals are asserted.

12. A method of processing data comprising the steps of:

receiving a plurality of interrupt signals having respective priority levels;

determining a highest priority level among interrupt signals concurrently asserted at a given time, said determination of said highest priority level completing at an arbitration-completed time following said given time; and in parallel with said determining of said highest priority level among said interrupt signals, asserting a trigger signal for initiating interrupt processing before said arbitration-completed time when one or more of said plurality of interrupt signals are asserted.

* * * * *